(12) United States Patent
Kasper

(10) Patent No.: US 9,951,730 B2
(45) Date of Patent: Apr. 24, 2018

(54) FUEL PUMP ASSEMBLY

(75) Inventor: Andreas Kasper, Duelmen (DE)

(73) Assignee: Hengst SE & Co. KG, Muenster (DE)

( * ) Notice: Subject to any disclaimer, the term of this patent is extended or adjusted under 35 U.S.C. 154(b) by 879 days.

(21) Appl. No.: 14/348,503

(22) PCT Filed: Aug. 13, 2012

(86) PCT No.: PCT/EP2012/065777
§ 371 (c)(1),
(2), (4) Date: Jul. 21, 2014

(87) PCT Pub. No.: WO2013/045165
PCT Pub. Date: Apr. 4, 2013

(65) Prior Publication Data
US 2014/0328708 A1    Nov. 6, 2014

(30) Foreign Application Priority Data

Sep. 29, 2011  (DE) .................. 10 2011 083 787

(51) Int. Cl.
*F02M 21/02*   (2006.01)
*F02M 37/22*   (2006.01)
(Continued)

(52) U.S. Cl.
CPC ........... *F02M 37/16* (2013.01); *B01D 29/114* (2013.01); *B01D 35/153* (2013.01);
(Continued)

(58) Field of Classification Search
CPC ........ F04B 53/12; F04B 9/14; F04B 43/0063; F02M 37/16; F02M 37/22
See application file for complete search history.

(56) References Cited

U.S. PATENT DOCUMENTS 4,747,760 A * 5/1988 Eberl .................. F04B 9/14
                                          123/179.9
6,019,890 A * 2/2000 Janik .................. B01D 35/26
                                          210/117
(Continued)

FOREIGN PATENT DOCUMENTS

CH          453795       3/1968
DE          8909261      10/1989
(Continued)

OTHER PUBLICATIONS

English translation of DE 8909261.*
International Search Report, dated Nov. 13, 2012.

*Primary Examiner* — Dominick L Plakkoottam
(74) *Attorney, Agent, or Firm* — Greer, Burns & Crain, Ltd.

(57) ABSTRACT

The invention relates to a fuel pump assembly for a motor vehicle, which can be upstream of a fuel pump of the motor vehicle in a fuel line of the motor vehicle, having a pump housing and a pump device arranged thereupon, by means of which fuel can be pumped into and/or through the pump housing when the pump device is in the active state thereof, wherein the pump device has at least one stroke piston pump having an inlet valve and an outlet valve which are opened and closed in alternation by pressure activation when the pump device is active. In order to provide a fuel pump assembly which enables a very energy efficient operation of a motor vehicle thereby equipped, according to the invention the inlet valve and the outlet valve are held in the open positions thereof when the pump device is inactive.

10 Claims, 4 Drawing Sheets

(51) Int. Cl.
*F02M 37/16* (2006.01)
*B01D 35/26* (2006.01)
*F02M 37/00* (2006.01)
*F04B 9/14* (2006.01)
*F04B 53/12* (2006.01)
*B01D 35/157* (2006.01)
*B01D 35/153* (2006.01)
*B01D 29/11* (2006.01)

(52) U.S. Cl.
CPC ......... *B01D 35/1573* (2013.01); *B01D 35/26* (2013.01); *F02M 21/0245* (2013.01); *F02M 37/0023* (2013.01); *F02M 37/22* (2013.01); *F04B 9/14* (2013.01); *F04B 53/12* (2013.01); *F02M 2037/225* (2013.01); *F02M 2700/137* (2013.01)

(56) References Cited

U.S. PATENT DOCUMENTS

| | | | | |
|---|---|---|---|---|
| 8,147,691 | B2* | 4/2012 | Krull | B01D 27/005 |
| | | | | 210/232 |
| 8,590,493 | B1* | 11/2013 | Torgerud | B01D 17/0214 |
| | | | | 123/196 A |
| 9,033,682 | B2* | 5/2015 | Thalmann | F02M 37/16 |
| | | | | 123/179.11 |

FOREIGN PATENT DOCUMENTS

| | | | | |
|---|---|---|---|---|
| DE | 8909261 U1 | * | 10/1989 | ............. B01D 35/26 |
| DE | 102009040655 | | 3/2011 | |

\* cited by examiner

FUEL PUMP ASSEMBLY

CROSS-REFERENCES TO RELATED APPLICATIONS

This application claims the benefit of the German patent application No. 10 2011 083 787.6 filed on Sep. 29, 2011, the entire disclosures of which are incorporated herein by way of reference.

BACKGROUND OF THE INVENTION

The present invention relates to a fuel pump assembly for a motor vehicle that can be connected upstream from a fuel pump of the motor vehicle in a fuel line of the motor vehicle, having a pump housing and a pump device situated thereon with which fuel can be pumped into and/or through the pump housing when the pump device is in its active state, the pump device having at least one stroke piston pump having an inlet valve and an outlet valve that are alternately opened and closed by pressure actuation when the pump device is active.

From utility patent DE 89 09 261 U1, a corresponding fuel pump assembly is known with which, for example before the first operation of the internal combustion engine of the motor vehicle or before the commissioning of the internal combustion engine after complete emptying of the fuel tank of the motor vehicle, the fuel line between the fuel tank and the internal combustion engine can be evacuated of air and at the same time filled with fuel. The fuel pump assembly is integrated into a filter device that can be connected upstream from a fuel pump of the motor vehicle, for filtering the fuel that is taken from the fuel tank and that can be supplied to the fuel pump; the filtered fuel can be supplied by the fuel pump to the injection valves or to the injection pump of the internal combustion engine. Thus, the pump housing of the fuel pump assembly is at the same time a part of the filter device.

On the pump housing there is situated a pump device that has a stroke piston pump. The stroke piston pump includes an inlet valve having a ball-shaped valve body and an outlet valve whose valve body is formed by the piston of the stroke piston pump. By means of the pump device, the fuel can be pumped into and/or through the pump housing when the pump device is in its active state, the inlet valve and the outlet valve being alternately opened and closed by pressure actuation when the pump device is active. In order to transfer the pump device from its inactive state to its active state, the actuating element of the stroke piston pump, fashioned as a knurled wheel, must be unscrewed from the cover of the housing of the filter device. If, on the other hand, the actuating element is screwed to the housing cover, the pump device is in its inactive state, in which the pump device holds the outlet valve in its open position. When the pump device is inactive, the inlet valve is closed, because the ball-shaped valve body of the inlet valve is pressed against the valve seat due to the force of the weight acting on the valve body and due to a ramp declining in the direction of the valve seat of the inlet valve.

Here, it is disadvantageous that when the pump device is inactive, the fuel pumped through the fuel pump assembly by the fuel pump of the motor vehicle has to lift the ball-shaped valve body of the inlet valve from its valve seat. This results in a loss of pressure in the fuel stream conveyed by the fuel pump that either has to be accepted, which is associated with a worsening of the supply of fuel to the internal combustion engine and thus of the performance of the internal combustion engine, or else compensated by the use of a more powerful fuel pump. Both procedures are associated with an increased consumption of fuel, which is unacceptable in particular with regard to today's requirements of energy efficiency of internal combustion engines, or motor vehicles equipped therewith.

SUMMARY OF THE INVENTION

On the basis of the above, the object of the present invention is to provide a novel fuel pump assembly for a motor vehicle that enables a very energy-efficient operation of a motor vehicle equipped therewith.

In a fuel pump assembly of the type named above, according to the present invention this object is achieved in that the inlet valve and the outlet valve are each held in their open positions when the pump device is inactive.

According to the present invention, therefore, when the pump device is inactive the fuel conveyed through the pump housing of the fuel pump assembly by the fuel pump of the motor vehicle must not open any valve of the fuel pump assembly, so that there is no pressure loss in the fuel stream through the pump housing. Because during operation of the fuel pump assembly according to the present invention there occurs no loss of pressure through the valves in the fuel flowing through the pump housing, a motor vehicle equipped with the fuel pump assembly according to the present invention can be operated in a significantly more energy-efficient fashion.

According to an advantageous embodiment of the present invention, the stroke piston pump has a cylinder and a piston rod situated so as to be axially movable therein, on which there is situated a piston, the piston releasing a through-opening between itself and the cylinder when the pump device is inactive, the piston, or the piston rod, holding the valve body of the outlet valve in its open position when the pump device is inactive, and the valve body of the outlet valve being situated in the pump housing so as to be movable in the direction of the longitudinal axis of the piston rod. According to this embodiment of the present invention, the outlet valve is not, as in the above-described existing art, formed by the piston and the cylinder of the stroke piston pump; rather, a separate outlet valve is present, connected downstream from the piston in terms of flow. The piston of the stroke piston pump rather forms the valve body of the inlet valve, which is held in its open position, when the pump device is inactive, by the release of the through-opening between the cylinder and the piston. At the same time, the valve body of the outlet valve, and thus the outlet valve itself, is held in its open position by the piston or by the piston rod of the valve body. The pump device according to this embodiment of the present invention is simple in its construction and can therefore be produced at low cost.

In order to hold the inlet valve and the outlet valve in their respective open positions when the pump device is inactive, the piston rod must somehow be secured on the pump housing so as to be secured against movements along its longitudinal axis relative to the pump housing. This can be accomplished for example by fixing to the pump housing an actuating element connected to the piston rod at the end remote from the piston. For this purpose, for example a threaded connection corresponding to the above-described existing art, a locking connection, or a fixing using an arresting mechanism fashioned in some other way can be used.

According to a further advantageous embodiment of the present invention, the piston rod has, at its end at the piston, an actuating extension that protrudes axially past the piston, via which the piston rod can be brought into contact with the valve body of the outlet valve. According to this, when the pump device is inactive the valve body of the outlet valve is held in its open position by the piston rod, or by its actuating extension protruding axially past the piston. This embodiment of the present invention increases the number of possible constructive realizations of the fuel pump assembly according to the present invention.

A further advantageous embodiment of the present invention provides that at the end of the cylinder facing the outlet valve there is situated a sleeve that forms the valve seat of the outlet valve and is oriented coaxially to the cylinder, on which there is fastened a counter-bearing [or: support], a pressure spring being situated between the counter-bearing and the valve body of the outlet valve, the spring applying force to the valve body in the direction of its closing position. This also represents an embodiment of the fuel pump assembly according to the present invention that has a very simple construction and that promotes a multiplicity of possible realizations. In particular, in this way it is possible to use the piston of the stroke piston pump as valve body of the inlet valve, because when the pump device is active a closed chamber is formed at the lower end of the cylinder of the stroke piston pump in which, when the piston moves away from the outlet valve, a partial vacuum is produced that brings about an opening of the inlet valve by at least partly breaking the sealing of the piston relative to the inner wall of the cylinder, through elastic deformation of the sealing part of the piston, so that fuel can flow into the chamber.

In addition, it is regarded as advantageous if the counter-bearing is the base of a cage that is permeable to liquid and is situated coaxially to the cylinder on the sleeve. The cage preferably has a cylindrical jacket in which through-openings are fashioned. Particularly preferably, the cage is connected to the sleeve by a locking connection. In this way, the cage can easily be connected to the sleeve and can therefore easily be exchanged as needed. Alternatively, however, a threaded connection may also be provided between the cage and the sleeve.

According to a further advantageous specific embodiment of the present invention, the fuel pump assembly has a filter element situated in the pump housing downstream from the pump device for the filtering of fuel pumped by the pump device. Of course, when the pump device is inactive the filter element also filters the fuel conveyed through the pump housing by the fuel pump of the motor vehicle. The filter element is for example fashioned as a hollow cylinder and situated coaxially to the cylinder of the stroke piston pump.

In addition, it is proposed that on the outer side of the sleeve there is situated a circumferential collar that stands in contact with an end face of the filter element. In this way, the sleeve is given a further functionality that goes along with a constructively simple realization of the fuel pump assembly according to the present invention. For an exchange that may be required of the filter element, first the sleeve is detached from the cylinder of the stroke piston pump, after which the existing filter element can be exchanged for a new one.

In the following, further advantages and features of the present invention are explained in more detail on the basis of the exemplary embodiment shown in the accompanying Figures of the fuel pump assembly according to the present invention.

DETAILED DESCRIPTION OF THE PREFERRED EMBODIMENTS

Figure 1:
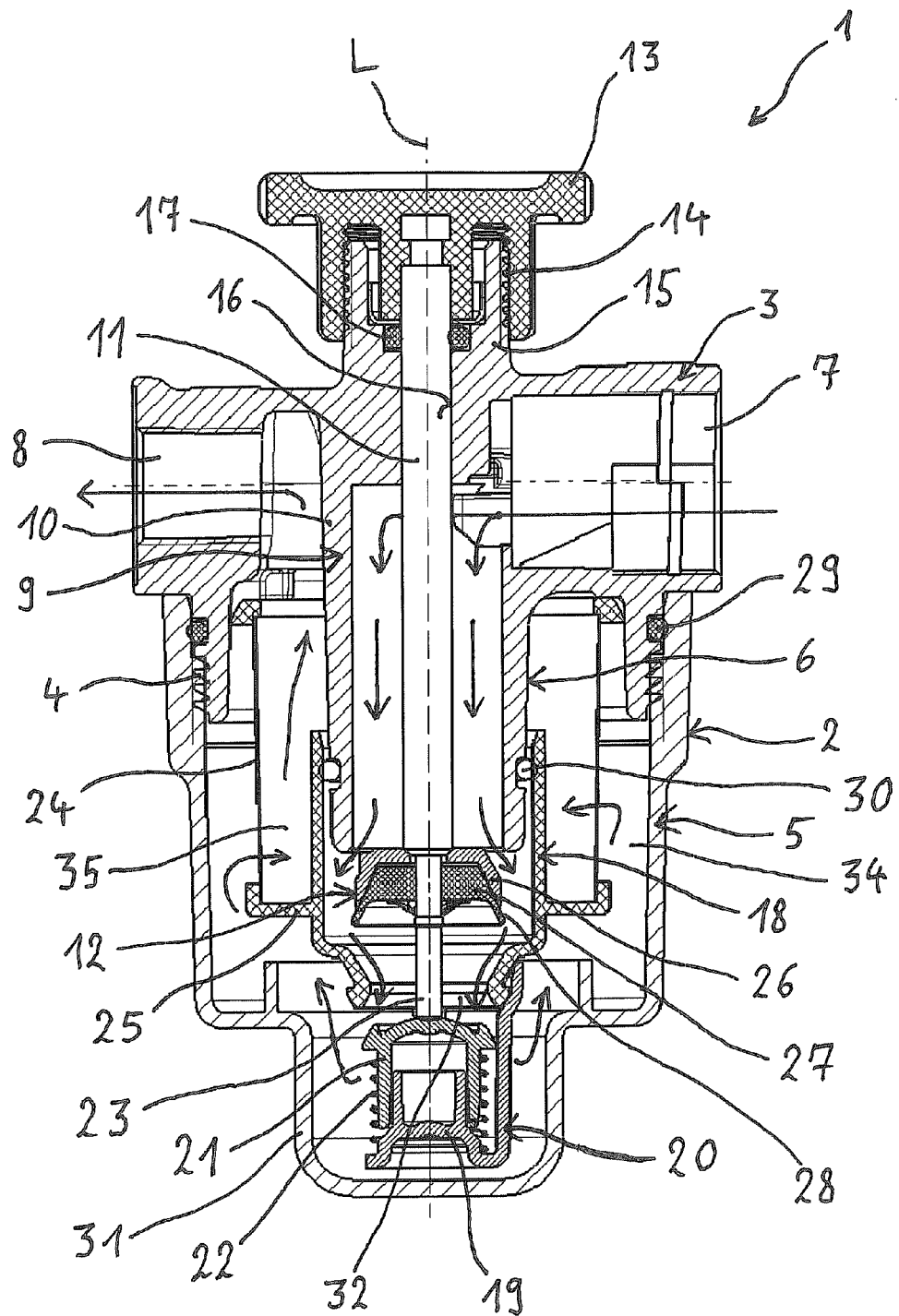
FIG. 1 shows a longitudinal section through an exemplary embodiment of the fuel pump assembly according to the present invention with inactive pump device.

FIG. 1 shows an exemplary embodiment of fuel pump assembly 1 according to the present invention in longitudinal section for a motor vehicle (not shown). Fuel pump assembly 1 includes a pump housing 2 that has a housing upper part 3 and a housing lower part 5 screwed onto housing upper part 3 via a threading 4, and a pump device 6, situated on pump housing 2, that according to FIG. 1 is in its inactive state. Housing upper part 3 is sealed relative to housing lower part 5 by a seal 29.

On housing upper part 3 there is situated a fuel inlet 7 and a fuel outlet 8. In addition, on housing upper part 3 there is provided a stroke piston pump 9 having a cylinder 10 and having a piston rod 11 situated so as to be movable axially therein, on which rod there is situated a piston 12. Piston 12 is the valve body of the inlet valve of stroke piston pump 9, and has a rigidly fashioned supporting plate 26 and a support 27 situated on the lower side thereof made of an elastic material that forms a circumferential sealing lip 28. When pump device 6 is inactive, piston 12 releases a through-opening between itself and cylinder 10 through which fuel can flow. Cylinder 10 is made in one piece with the rest of housing upper part 3. Piston rod 11 is situated so as to be movable relative to housing upper part 3 in an axial bore 16 in an upward-protruding extension 15 of housing upper part 3, and is sealed relative to housing upper part 3 by an annular seal 17. On the upper end of piston rod 11 there is situated an actuating element 13 fashioned as a knurled wheel that is fixed, via a threading 14, on upward-protruding extension 15 of housing upper part 3, whereby pump device 6 is in its inactive state. In this state of fuel pump assembly 1, a quantity of fuel conveyed by a fuel pump (not shown) of a motor vehicle can be conveyed through pump housing 2 in a manner corresponding to the arrows shown in FIG. 1.

On the lower end of cylinder 10 there is situated a sleeve 18, oriented coaxially to cylinder 10, that is sealed relative to cylinder 10 by a seal 30 and whose lower end forms valve seat 32 of the outlet valve. On sleeve 18 there is fastened a counter-bearing 19 that is the base of a cage 20 that is permeable to liquid and is situated on sleeve 18 coaxial to cylinder 10; in cage 20 there are fashioned through-openings, of which one can be seen on the left side of cage 20 in that no part of the jacket of cage 20 is shown there. Between counter-bearing 19 and valve body 21 of the outlet valve there is situated a pressure spring 22 that applies force to valve body 21 in the direction of its closing position; valve body 21 of the outlet valve is situated in pump housing 2 so as to be capable of movement in the direction of longitudinal axis L of piston rod 11. Cage 20 is connected to sleeve 18 via a locking connection and is accommodated in a coaxially situated lower recess 31 of housing lower part 5. Housing rod 11 has, on its end at the piston, an actuating extension 23 that axially protrudes past piston 12, via which piston rod 11 can be brought into contact with valve body 21 of the outlet valve. In this way, piston rod 11 holds valve body 21 of the outlet valve in its open position when pump device 6 is inactive, as shown in FIG. 1. Consequently, the inlet valve and the outlet valve are each held in their open positions when pump device 6 is inactive.

Fuel pump assembly 1 further includes a filter element 24 that is situated in pump housing 2 and is connected downstream from pump device 6 and is fashioned as a hollow cylinder, for filtering the fuel pumped by fuel device 6. On the outer side of sleeve 18 there is situated a circumferential collar 25 that stands in contact with the lower end face of filter element 24. Filter element 24 separates a raw chamber 34 that is connected to fuel inlet 7 from a clean chamber 35 that is connected to fuel outlet 8.

Figure 2:
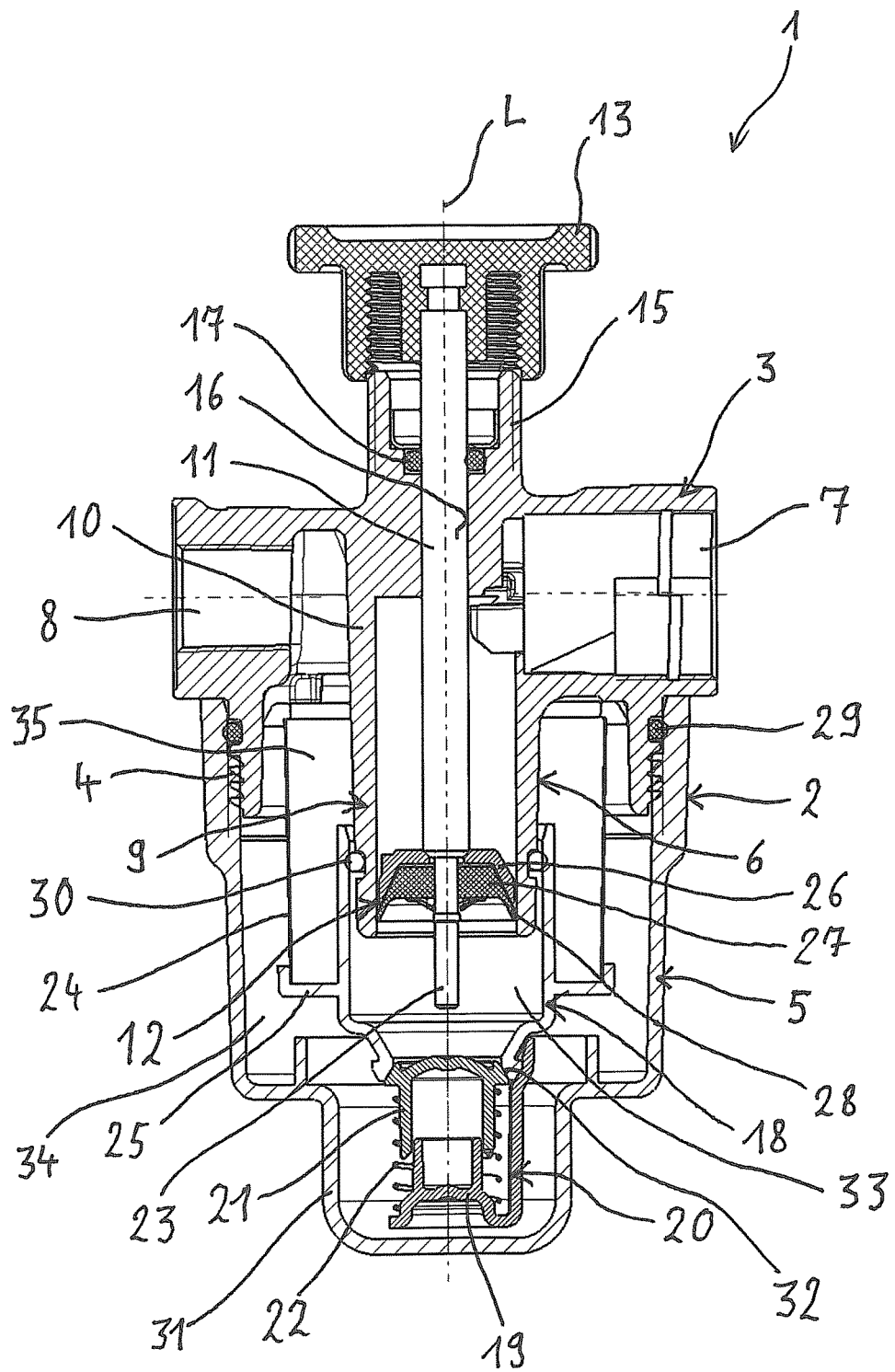
FIG. 2 shows the exemplary embodiment of FIG. 1 with active pump device, in a first pumping state.
Figure 3:
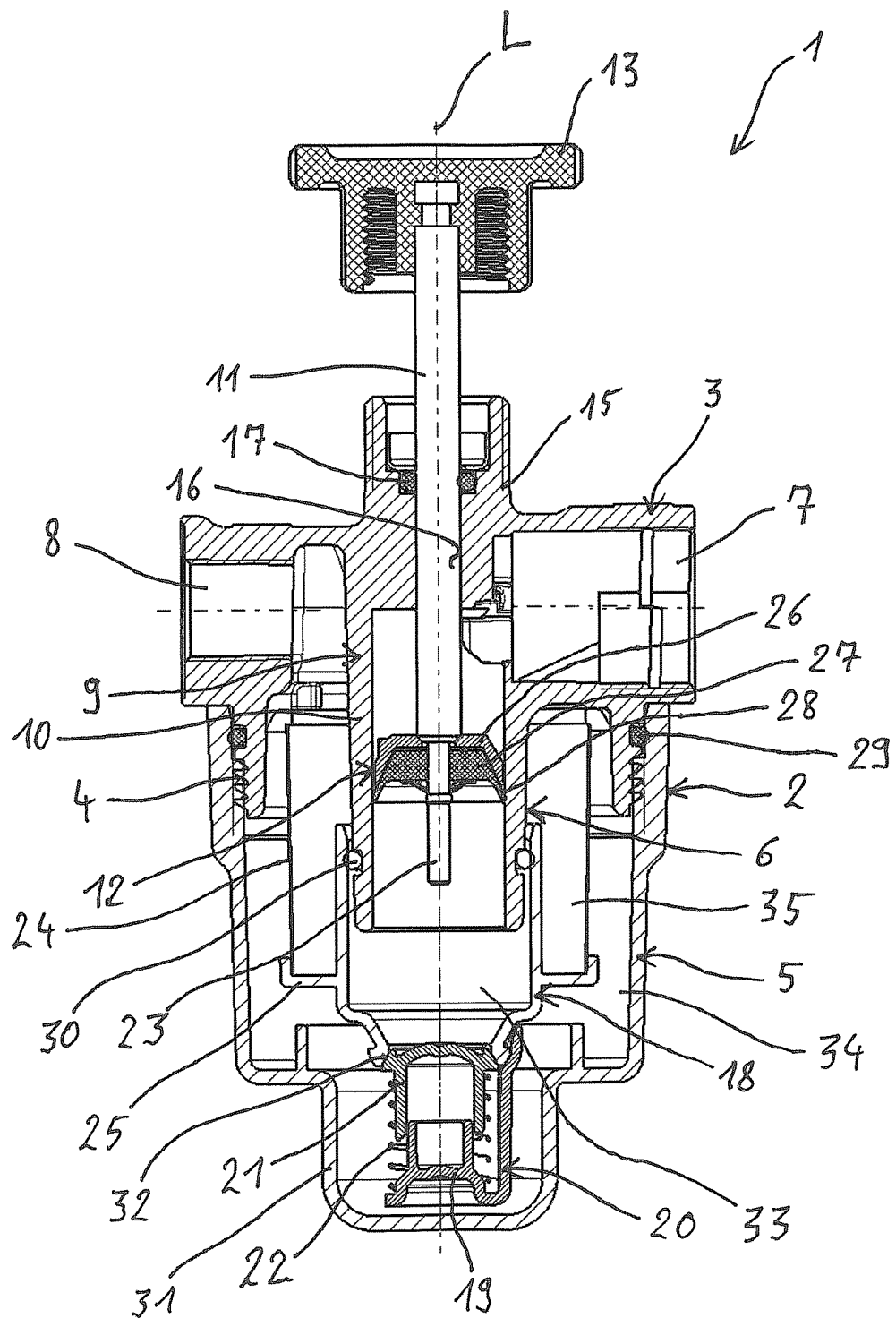
FIG. 3 shows the exemplary embodiment of FIG. 1 with active pump device, in a second pumping state.
Figure 4:
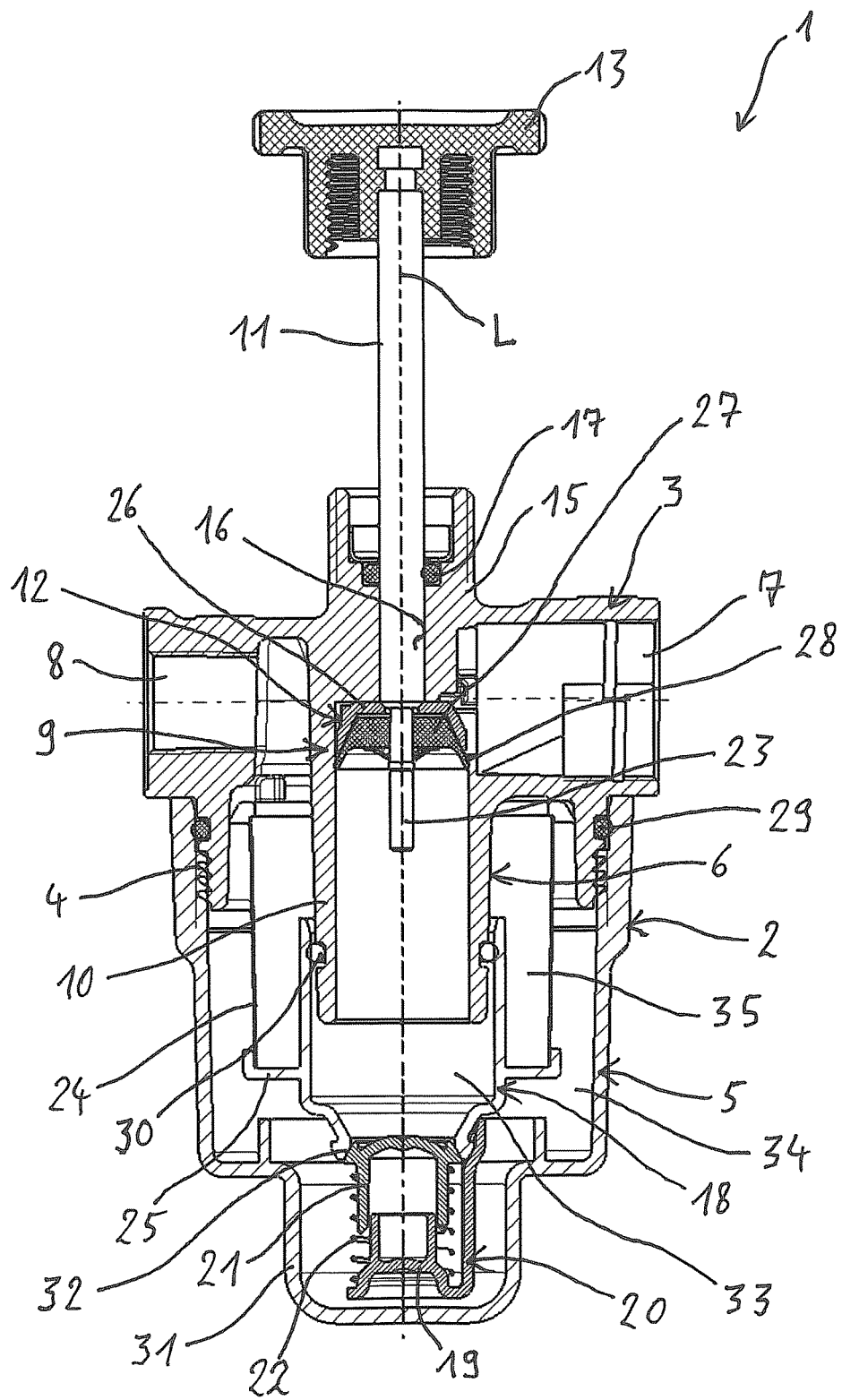
FIG. 4 shows the exemplary embodiment of FIG. 1 with active pump device, in a third pumping state.

The functioning of fuel pump assembly 1 is clear from a combined view of FIGS. 1 through 4: fuel pump assembly 1 can pump fuel into and/or through pump housing 2 when pump device 6 is in its active state, shown in FIGS. 2 through 4. When pump device 6 is active, the inlet valve and the outlet valve are alternately opened and closed by pressure actuation.

FIG. 2 shows a first pumping state of fuel pump assembly 1 shown in FIG. 1 when pump device 6 is active. Threading 14 between actuating element 13 and upward-protruding extension 15 of housing upper part 3 is disconnected, causing piston rod 11 together with piston 12 and actuating extension 23 to move upward. Actuating extension 23 is no longer in contact with valve body 21 of the outlet valve, so that this valve body 21 is pressed by pressure spring 22 with force against valve seat 32 of the outlet valve, formed by the lower end of sleeve 18. In this way, a closed chamber 33 is fashioned.

FIG. 3 shows a second pumping state of fuel pump assembly 1 shown in FIG. 1 with active pump device 6; here piston rod 11 together with piston 12 and actuating extension 23 has been moved further upward in comparison with FIG. 2, via actuating element 13. Due to the partial vacuum that forms in chamber 33 when there is such a movement, the inlet valve is opened in that sealing lip 28 of support 27 is brought at least partly out of contact with the inside of cylinder 10. A quantity of fuel situated over piston 12 would in this way move into chamber 33, which is becoming larger.

FIG. 4 shows a third pumping state of fuel pump assembly 1 shown in FIG. 1 with active pump device 6; here, piston rod 11 together with piston 12 and actuating extension 23 has been moved further upward in comparison with FIG. 3, via actuating element 13. In FIG. 4, chamber 33 has its maximum volume. For the pumping of the fuel by fuel pump assembly 1, in the following step piston rod 11 together with piston 12 and actuating extension 23 is moved downward via actuating means 13, causing the pressure in chamber 33 to assume a magnitude that brings about a lifting of valve body 21 of the outlet valve from its valve seat 32, so that fuel present in chamber 33 can flow from liquid-permeable cage 20 into raw chamber 34, and upon further actuation of pump device 6 can move through filter element 24 into clean chamber 35, from where it can exit fuel pump assembly 1 via fuel outlet 8.

The exemplary embodiment described on the basis of the Figures is provided for explanation and is not limiting.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 fuel pump assembly
2 pump housing
3 housing upper part
4 threading
5 housing lower part
6 pump device
7 fuel inlet
8 fuel outlet
9 stroke piston pump
10 cylinder
11 piston rod
12 piston
13 actuating element
14 threading
15 extension
16 bore
17 seal
18 sleeve
19 counter-bearing
20 cage
21 valve body
22 pressure spring
23 actuating extension
24 filter element
25 collar
26 supporting plate
27 support
28 sealing lip
29 seal
30 seal
31 recess
32 valve seat
33 chamber
34 raw chamber
35 clean chamber
L longitudinal axis

The invention claimed is:

1. A fuel pump assembly for a motor vehicle that can be connected upstream from a fuel pump of the motor vehicle in a fuel line of the motor vehicle, comprising:
   a pump housing and a pump device situated thereon with which fuel can be pumped at least one of into or through the pump housing when the pump device is in its active state,
   the pump device comprising at least one stroke piston pump having an inlet valve and an outlet valve that are alternately opened and closed by pressure actuation when the pump device is active, such that when the inlet valve is open, the outlet valve is closed, and
   the inlet valve is provided on a piston of the stroke piston pump,
   wherein the inlet valve and the outlet valve are each held in their open positions when the pump device is inactive in such a way that fuel that is pumped by the fuel pump of the motor vehicle through the pump housing of the fuel pump assembly does not have to open any valve of the fuel pump assembly.

2. The fuel pump assembly as recited in claim 1, wherein the piston of the stroke piston pump forms the valve body of the inlet valve.

3. The fuel pump assembly as recited in claim 2, wherein the piston has a rigidly fashioned supporting plate and has a support that is situated on a lower side thereof, made of an elastic material, and that forms a circumferential sealing lip.

4. The fuel pump assembly as recited in claim 1, wherein the stroke piston pump has a cylinder and a piston rod situated so as to be axially movable therein, on which piston rod the piston is situated, the piston releasing a through-opening between itself and the cylinder when the pump device is inactive, one of the piston and the piston rod holding a valve body of the outlet valve in its open position when the pump device is inactive, and the valve body of the outlet valve being situated in the pump housing so as to be movable in the direction of a longitudinal axis of the piston rod.

5. The fuel pump assembly as recited in claim 4, wherein the piston rod has, at its end at the piston, an actuating extension that protrudes axially past the piston, via which the piston rod can be brought into contact with the valve body of the outlet valve.

6. The fuel pump assembly as recited in claim 4, wherein at an end of the cylinder facing the outlet valve there is situated a sleeve that forms the valve seat of the outlet valve and is oriented coaxially to the cylinder, on which sleeve there is fastened a counter-bearing, a pressure spring being situated between the counter-bearing and the valve body of the outlet valve, which pressure spring applies force to the valve body in the direction of its closing position.

7. The fuel pump assembly as recited in claim 6, wherein the counter-bearing is the base of a liquid-permeable cage that is situated on the sleeve, coaxial to the cylinder.

8. The fuel pump assembly as recited in claim 7, wherein the cage is connected to the sleeve via a locking connection.

9. The fuel pump assembly as recited in claim 1, including a filter element that is situated in the pump housing and is connected downstream from the pump device, for the filtering of fuel pumped by the pump device.

10. The fuel pump assembly as recited in claim 6, including a filter element that is situated in the pump housing and is connected downstream from the pump device, for the filtering of fuel pumped by the pump device, wherein on the outer side of the sleeve there is situated a circumferential collar that stands in contact with an end face of the filter element.

* * * * *